(12) United States Patent
Meyer (10) Patent No.: US 11,849,183 B2
(45) Date of Patent: Dec. 19, 2023

(54) VIDEO SECURITY SYSTEM

(71) Applicant: VBrick Systems, Inc., Herndon, VA (US)

(72) Inventor: Olivier Meyer, Herndon, VA (US)

(73) Assignee: VBrick Systems, Inc., Herndon, VA (US)

( * ) Notice: Subject to any disclaimer, the term of this patent is extended or adjusted under 35 U.S.C. 154(b) by 226 days.

(21) Appl. No.: 17/361,730

(22) Filed: Jun. 29, 2021

(65) Prior Publication Data

US 2021/0409825 A1  Dec. 30, 2021

Related U.S. Application Data

(60) Provisional application No. 63/045,399, filed on Jun. 29, 2020.

(51) Int. Cl.
| | |
|---|---|
| H04N 21/454 | (2011.01) |
| H04L 9/40 | (2022.01) |
| G06F 21/62 | (2013.01) |
| G06F 16/78 | (2019.01) |
| G06F 16/783 | (2019.01) |
| G06F 21/32 | (2013.01) |

(52) U.S. Cl.
CPC ..... *H04N 21/4542* (2013.01); *G06F 16/7844* (2019.01); *G06F 16/7867* (2019.01); *G06F 21/32* (2013.01); *G06F 21/6209* (2013.01); *H04L 63/101* (2013.01); *H04L 63/105* (2013.01)

(58) Field of Classification Search
CPC ............... G06F 16/7844; G06F 21/31; G06F 2221/2141; G06F 16/7867; G06F 21/32; G06F 16/735; G06F 21/6209; H04N 21/26208; H04N 21/234345; H04N 21/25875; H04N 21/4542; H04N 21/26258; H04L 63/105; H04L 63/101
See application file for complete search history.

(56) References Cited

U.S. PATENT DOCUMENTS

| | | | | |
|---|---|---|---|---|
| 2014/0280272 | A1* | 9/2014 | Choque | G06F 16/137 707/758 |
| 2014/0304373 | A1* | 10/2014 | Tarbox | H04L 65/60 709/219 |
| 2017/0163683 | A1* | 6/2017 | van den Berghe | H04L 65/70 |
| 2020/0154165 | A1* | 5/2020 | Cohen | G06V 20/49 |

\* cited by examiner

*Primary Examiner* — Chenea Davis
(74) *Attorney, Agent, or Firm* — Jeffri A. Kaminski; Venable LLP (57) ABSTRACT

A system and method to tag portions of a video with an access-control-list (ACL) for those periods of time (e.g., video segments, series of video frames, etc.) within a video that require elevated permission to view or access is provided. At playback time, the access-control-list is dynamically enforced in real-time to ensure that a user viewing or editing the video has permissions to view upcoming portions of the video. When a user has insufficient permission to view a portion of the video, a filler frame, blurred content or blank frame is displayed in the place of the actual video content. Audio may also be muted or beeped out during the periods of the video for which there is insufficient permissions.

21 Claims, 4 Drawing Sheets

VIDEO SECURITY SYSTEM

BACKGROUND

1. Technical Field

The present disclosure relates to a content protection system, and more specifically to a fine-grained video data security enforcement mechanism with automated access-control, compliance and governance enforcement using artificial intelligence ("A/I") and machine learning.

2. Introduction

In the world of relational data management, there are levels of granularity for securing relational data, for example, table-level authorization, row-level authorization and column-level authorization. In general, table authorization means there is permission to know that a table of data exists and barring any more fine-grained permission restrictions, permissions to the set of data contained within the table, for example access to a list of customers. Row-level permission controls access to a specific record of data, for example the customer record for Acme Corp. Column-level permissions controls access to a certain attributes for customer records, for example the ability to view customer phone numbers within customer records.

Video content protection does not have the same level of maturity or flexibility in securing videos as for relational data. Current video content security systems secure access to an entire video or to a collection of videos. Current systems cannot reach into the video itself and protect segments or data within the video. Effectively, today in the world of video there is "table level" authorization and "row level" authorization. There is a need to for a more granular protection system that can dynamically identify segment within a video that require enhanced security and enforce access controls to those segments.

Additionally, there is a need to leverage A/I and machine learning to automate the application of that security and enforcement. That is to secure certain portions of a video as requiring additional permissions and to ensure that only authorized principals are allowed to view and hear those portions of a video.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Embodiments of the invention provide a system for secure video playback, the system comprising: one or more processors; and memory storing instructions that, when executed, cause the one or more processors to: receive a request to play a video; determine an access level of the requestor; retrieve metadata regarding the video from a database, the metadata including an access control list for the video and identifying segments of the video that include protected content; compare the access level of the requestor with an access requirement of the protected content in the video; retrieve video segments from the database for those segments where the access level of the user meets the access requirement of the access control list to form a first set of video segments; retrieve filler video segments for those video segments where the access level of the user does not meet the access requirement of the access control list to form a second set of video segments; dynamically create a playlist for the video, the playlist including the first and second set of video segments, and not including those video segments where the access level of the user does not meet the access requirement of the access control list; and sending the playlist to the requestor.

Embodiments of the invention provide a computer-implemented method, comprising: presenting a video timeline for a video to a user via a video editing tool; receiving input identifying segments of the video including restricted content; receiving in an identification of an access level for the restricted content; associating the access level with respective video segments in a database; receiving at a server a request to play a video; determining an access level of the requestor; retrieving the access level for the video from the database; compare the access level of the requestor with the access level of the protected content; retrieving video segments of the video where the access level of the user meets the access requirement to form a first set of video segments; retrieving filler video segments for those video segments where the access level of the user does not meet the access requirement list to form a second set of video segments; dynamically create a playlist for the video, the playlist including the first and second sets of video segments, and not including video segments where the access level of the user does not meet the access requirement of the access control list; and sending the playlist to the requestor.

Embodiments of the invention provide a computer-implemented method, comprising: receiving a dictionary of restricted content; analyzing videos to identify the restricted content in the videos and a location of the restricted content in the videos; determining an access level for the identified restricted content; creating identifiers for video segments forming the videos; associating the access level with the respective segments and storing the metadata with the video files; receiving a request to play a video; determining an access level of the requestor; retrieving metadata regarding the video from a database, the metadata including an access control list for the video and segments of the video including protected content; comparing the access level of the requestor with the access level of the protected content; retrieving video segments from the database for those segments where the access level of the user meets the access requirement of the access control list to form a first set of video segments; retrieving filler video segments for those video segments where the access level of the user does not meet the access requirement of the access control list to form a second set of video segments; dynamically creating a playlist for the video, the playlist including the first and second set of video segments, and not including those video segments where the access level of the user does not meet the access requirement of the access control list; and sending the playlist to the requestor.

Disclosed are systems, methods, and non-transitory computer-readable storage media a technical solution to the technical problem described.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media to tag portions of a video with an access-control-list (ACL) for those periods of time (e.g., video segments, series of video frames, etc.) within a video that require elevated permission to view or access. At playback time, the access-control-list is dynamically enforced in real-time to ensure that a user viewing or editing the video has permissions to view upcoming portions of the video. When a user has insufficient permission to view a portion of the video, a filler frame, blurred content or blank frame is displayed in the place of the actual video content. Audio may also be muted or beeped out during the periods of the video for which there is insufficient permissions.

The system may transcribe spoken words from the video, translate to multiple languages, identify people or items in a video, identify written words in shared content, etc. in order to analyze content in the video. A set of rules may be defined or identified for automated application of security based on the discovery or detection within the video of certain:

Spoken words

Written words

Translated words from original Spoken or Written words

Faces,

Scenes, or

Images (Items), for example a Logo Image.

The system may automatically add or apply an access-control-list to those portions of the video identified as requiring additional permission. As such, the process of "tagging" the video may be automated.

Embodiments of the invention may provide for additional configuration options around tolerance/confidence for automated detection of restricted content and the specification of a time window around the restricted section of a video to ensure entire restricted content is secured. Notifications may be provided to content owners and security administrators when such automated security tagging has been applied to a video for their awareness and review.

Consider the following example. A library of videos is stored in a database. Various videos in the library may include content that requires permission to access. Access to the video library may be managed by a server system. Different content may require different access levels. For example, some content may require a "classified" access level, and other content may require a "secret" access level. A dictionary of restricted content may be provided. The dictionary may include words, images, individuals, etc. that may be in the video and that require heightened protection. The access level for that content may also be associated with the content and stored in the dictionary. Portions of the video that include the protected content may be identified. The identification may be done by manually or by automatically tagging those video segments that include the protected content. The segments of a video that include the protected content may be listed and associated with the access level required to view that portion of the video. The list of protected segments and associated access level may be stored in an access control list for the video. The access control list may be stored as metadata associated with the video.

A request for a video in the library may be received from a client computer. Typically, a user that desires to view the video is authenticated before the requested video is provided. The authentication may occur prior to or subsequent to the request. As part of the authentication process an access level of the user may be determined. The access level of the user is compared to the access control list for the video to determine if the video includes any content that the user is not permitted to view. Those video segments that include restricted content are replaced with filler content, or omitted, when a playlist for the video is created. The playlist is provided to the client computer for viewing. None of the video segments for which the user does not have the requisite permission are included in the playlist provided to the client computer. Thus, the user cannot access those portions of the video, or is even aware that those portions of the video exist or where they may be located.

Additional examples and variations are provided in the figures, and these variations shall be described herein as the various embodiments are set forth.

Figure 1:
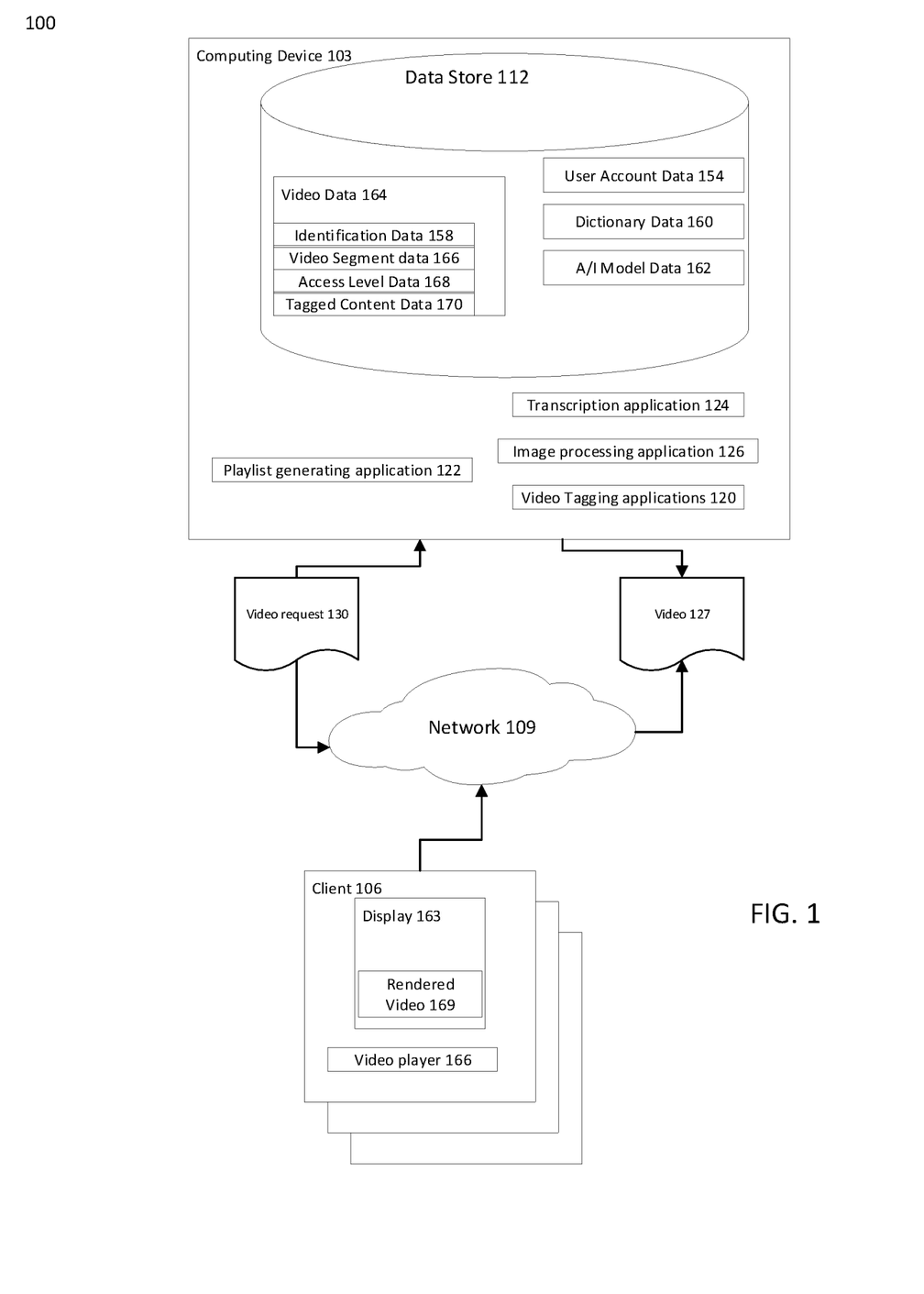
FIG. 1 illustrates an example system embodiment.

FIG. 1 illustrates an example networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include one or more video tagging applications 120, playlist generating applications 122, transcription applications 124, image processing applications 126, and other applications, services, processes, systems, engines, or functionality not discussed in detail herein. The video tagging applications 120 may be executed to identify or receive an identification of restricted content within a video. The restricted content may be any of spoken words, written words, translated words from original spoken or written words, faces, scenes, images, etc. The restricted content may be identified with reference to location of the restricted content in the video, such as the start/end time of the video segment, the frames or start/end frame, video segments, etc. of where the restricted content appears. Tags may also be applied to the video to indicate the location of the restricted content. The video tagging applications 120 may generate data identifying which video segments within the video include restricted content and the access level required to access that content. This data may be stored as the access-control list for the video. The transcription applications 124 and image processing applications 126 may be executed to analyze videos. The transcription applications 124 may convert the audio of a video to text. The text may be processed using natural language processing. The text may be analyzed, for example by the video tagging application, to identify restricted content. The image processing applications 126 may be executed to identify images, scenes, faces (including facial recognition) in the video. Image data from the image processing applications 126 may be analyzed by the video tagging applications 120 to identify restricted content. For example, the dictionary may define the retracted content. The transcription applications 124 and image processing applications 126 may execute to identify restricted content in the text or images of the video. Once identified, the location of the restricted content is determined. The location and the access level of the content are then used for the access control list.

The transcription applications 124 and image processing applications 126 may be part of or separate from the video tagging applications 120, and in some embodiments may be executed in conjunction with the video tagging application. The transcription applications 124 and image processing applications 126 also may be executed prior to the video tagging application. In such case the video tagging applications 120 execute using the results of the transcription and image processing applications.

The playlist generating applications 122 creates the playlist for a requested video. The playlist may be generated dynamically upon receipt of a request for the video. The playlist may be unique for each request and can also be unique for each user. The request for a video may be to play or download a recorded video or to play a live video. The playlist generating application 122 retrieves data from the data store 112, such as the access control list, associated with the video to determine if the video includes any restricted content and the access level for the restricted content. The playlist generating application 122 also receives an access level associated with the request, which is compared to the access level of the restricted content in the video. Those video segments for which the requestor does not have the required permissions to access the content and the location of that restricted content within the video are identified. In some cases, the particular video segments that include the restricted content may be specified as the location. Those video segments where the requestor has sufficient permissions are assembled into a playlist. Those video segments where the requestor does not have sufficient permissions are replaced or omitted from the playlist, and in some cases may be replaced with replacement video segments. For example, the playlist generating application 122 may determine the playtime of the video segments that include the restricted content. Replacement video segments with the same playtime as the segments including the restricted content may be selected and inserted into the playlist at appropriate positions. The replacement video segments also may be selected based on having content that is similar to the content of the video. For example, a content library may store replacement segments. The replacement segments may have an associated content type. A content type of the segments including the restricted content may be determined. Replacement segments having the same or similar content as the restricted segments may be selected for inclusion in the playlist. In some embodiments the replacement video segments may be the original video segments with the restricted content blacked-out, redacted, blurred, restricted words beeped out, etc.

The data stored in the data store 112 includes, for example, user account data 154, dictionary data 160, A/I model data 162, and video data 164 including identification data 158, video segment data 166, access level data 168, and tagged content data 170. User account data 154 includes data relating to user accounts with the video site. The user account data 154 may include data that facilitates authentication of clients 106 by way of username, password, security token, public key encryption, etc. The user account data 154 may also include data that indicates privileges and/or restrictions relating to access to videos and video content. The dictionary data 160 may include data defining the content that may be restricted. In some examples, the dictionary data 160 may specify data such as spoken or text, based words, phrases, sentences, etc. and images (still and moving), scenes, individuals, body parts, logos, etc. as restricted. The restricted content may be associated in the dictionary data 160 with an access level required to access that content. The dictionary data 160 may be generated automatically or manually. The A/I model data may include data used to train and recognize A/I or machine learning algorithms to identify restricted content in a video, for example, based on the dictionary data 160.

The video data 164 may be in any format, such as H.26x, MPEG, AVI, etc. The video data 164 may be converted into different formats when a playlist is generated. The video data 164 may include a database of videos. The video data 164 also may include replacement video segments to be used as replacements for video segments that include restricted content, as noted above. The video data 164 may include a list of video segments that comprises the video. The list may include addresses or otherwise point to the stored video segments. The video segments may have the same or different lengths. The video data 164 may also include access level data 168. The access level data 168 may be an access control list associated with respective video segments in order to define the access level required to access and/or view the respective video segment. The list of video segments may also identify those video segments that include restricted content. The access level of that content may also be indicated. The tagged content data 170 identifies the location of the restricted content in the video, such as the start/end time of the video segment, the frames or start/end frame, video segments, etc. where the restricted content appears. The video data 164 may also include information about the content of the video, such as a category, subject-matter, genre, location, etc. The video segment data 166, access level data 168, and tagged content data 170 may be stored as metadata for the video. The video data 164 may be stored in a database table, with an identifier for the video associated with the mentioned metadata for the video. The video data 164 may include the identifier for the video, and flags or indicators for whether the video includes restricted content, which video segments include that content, the access level of the restricted content, and/or the location of the restricted content in the video.

The video data 164 may also include replacement video segments. The replacement video segments may be associated with different videos and access levels for the content in those videos. The access level for the replacement video segment is associated with the replacement video segment in the database. Other information for the replacement video may be stored here, such as length, genre, if the replacement video segment is a replacement for a particular video segment, or group of segments, etc.

The replacement segments may be the original video segments with the restricted content omitted or rendered inaccessible. For example, a replacement video segment for an access level of "classified" may have different content rendered inaccessible or omitted than a replacement video segment for the same original video segment having an access level of "secret."

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 163. The display 163 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a video player 166 and/or other applications. The video player 166 may be executed in a client 106, for example, to originate video requests 130 and to access and render videos 127 or other content served up by the computing device 103 and/or other servers, thereby generating a rendered video 169 on the display 163. The client 106 may be configured to execute applications beyond video player 166 such as, for example, mobile applications, email applications, instant message applications, and/or other applications.

Next, a general description of the operation of the various components of the networked environment 100 is provided. To begin, a video request 130 is issued by a client 106 and sent to the computing device 103 by way of the network 109. A requestor, which may be the client 106 or an individual using client 106, making the request may be authenticated by the computing device 103. The authentication process may utilize the data stored in the user account data in data store 112. The authentication should verify the requestors identity and access level. The access level may be based on a security clearance, an individual, a group, etc.

The video request 130 is provided to the playlist generating application 122. The playlist generating application 122 generates the playlist for the video and applies the access control list so that only permitted content is provided in response to the request. More specifically, the playlist generating application 122 may determine if the video corresponding to the request includes any restricted content. In some embodiments, the playlist is a list of video segments for the video. The video segments may be individual files of a portion of the video, for example six second portions. Other sizes may also be used. When the playlist generating application 122 builds the playlist it checks which video segments may be included in the playlist based on the access level of the requestor and of the video content. Those video segments that the requestor has permission to see are included in the playlist. Those that the requestor does not have permission to see are replaced or omitted.

For example, the playlist generating application 122 retrieves the metadata associated with the requested video, for example the access control list. The metadata may include a list of the video segments for the video, including a list of video segments that include restricted content and the access level associate with that content. The playlist generating application 122 receives the access level associated with the request. The access level may be for the client computer or the individual requestor that has been authenticated. The playlist is generated dynamically for the request. Thus, each request may receive a playlist that is different from other playlists based on the access control list.

To generate playlist for the request, those segments where the access level of the requestor meets the access requirement of the access control list are gathered, for example in a first set of video segments. The set of video segments may be a list of the addresses, such as URLs, for the corresponding video segments. Those video segments where the access level of the requestor does not meet the access requirement of the access control list are identified. For those video segments, filler segments are retrieved, for example, in a second set of video segments. The filler segments may include address, such as URLs, where the actual filler segments are stored. The playlist generating application 122 creates the playlist, ordering the first and second set of video segments in the proper order for the video. The filler segments are positioned in place of video segments where the access level of the user does not meet the access requirement of the access control list for the requested video. Accordingly, the filler segments are played in real-time when the video is played. The playlist is provided to the requesting client device.

The playlist may be generated as a whole, at one time. This is typically done for recorded content. The playlist may also be created at intervals. For example, for live video the video player may periodically send requests for the video segments it is to play. In some embodiments this may also be done for recorded videos.

The filler segments may be the original video segments with the restricted content where the restricted content is blurred, redacted, blacked out, or otherwise made inaccessible to the player. In addition, the filler segments may include video segments different from the original video segments. These type of filler segments may be selected based on the length of time of the original video segments. In addition, the filler segments may be selected to be similar or related to the original video segments, such as category, subject-matter, genre, location, etc. The playlist generating application 122 may analyze the metadata for the video to determine a category, subject-matter, genre, location, etc. for the video. The playlist generating application 122 analyzes the metadata for the filler video segments, such as the segment length, category, subject-matter, genre, location, etc. and selects filler video segments that most closely match the original video segments being replaced. The filler segments may be created prior to the generation of the playlist and stored in the databases described above.

Embodiments of the invention also related to creating the access control list. In some embodiments, tools are provided for manual creation of the access control list. In other embodiments the access control list may be generated based on a dictionary of restricted content and applied automatically to video content. In other embodiments the access control list is generated and applied to a video based on machine learning and artificial intelligence.

In an exemplary embodiment, a video editing application may be provided. The video editing application may present a video as a timeline via the display 163 of the client 106. A user may select portions of the video based on the timeline and identify portions of the video as requiring an elevated access level to view. In some embodiments, the user may click to select the time, frame number, video segment, etc. where the elevated access level begins and ends. In some embodiments the user may identify, for example via a text box, drop-down menu, button, etc., individuals, groups, clearance levels, etc. that are permitted access to the identified content. The identified segments are associated with the access level in the access control list for the video.

In exemplary embodiments, a dictionary of restricted content may be provided, for example, dictionary data 160. The restricted content may be a list of words, corresponding translations, faces, scenes, images, locations, logos, etc. The access level for the content may be associated with that content in the dictionary. The dictionary data 160 may be a table including restricted content in a column and the associated access level for that content stored in the row for that content. The video tagging applications 120 can apply the dictionary to the video data 164 to create the access control list for that video. The transcription application converts the audio of the video to a text transcript. Words in the dictionary are compared to words in the transcript to identify restricted content. The portion of the video including the restricted content are automatically tagged. The tag may indicate the length of time the restricted content appears in the video and the associated access level. Image processing is also performed on the video in order to identify faces, scenes, images, locations, logos, etc. in the video that are in the dictionary. The images in the dictionary may be compared to the images in the video to identify restricted content. Those portion of the video including the restricted content are similarly tagged.

In an exemplary embodiment, machine learning algorithms and A/I may be used to create the dictionary and the access control list. Machine learning and A/I may also be used to analyze the video, apply the dictionary data 160 to the video and identify restricted content. The restricted content may be automatically tagged as described above. For example, transcription or image processing A/I models may be used and trained in order to identify and tag restricted content in the videos. The tagged videos may be stored as video data 164, such as the access control list, in the video data 164 storage.

Figure 2:
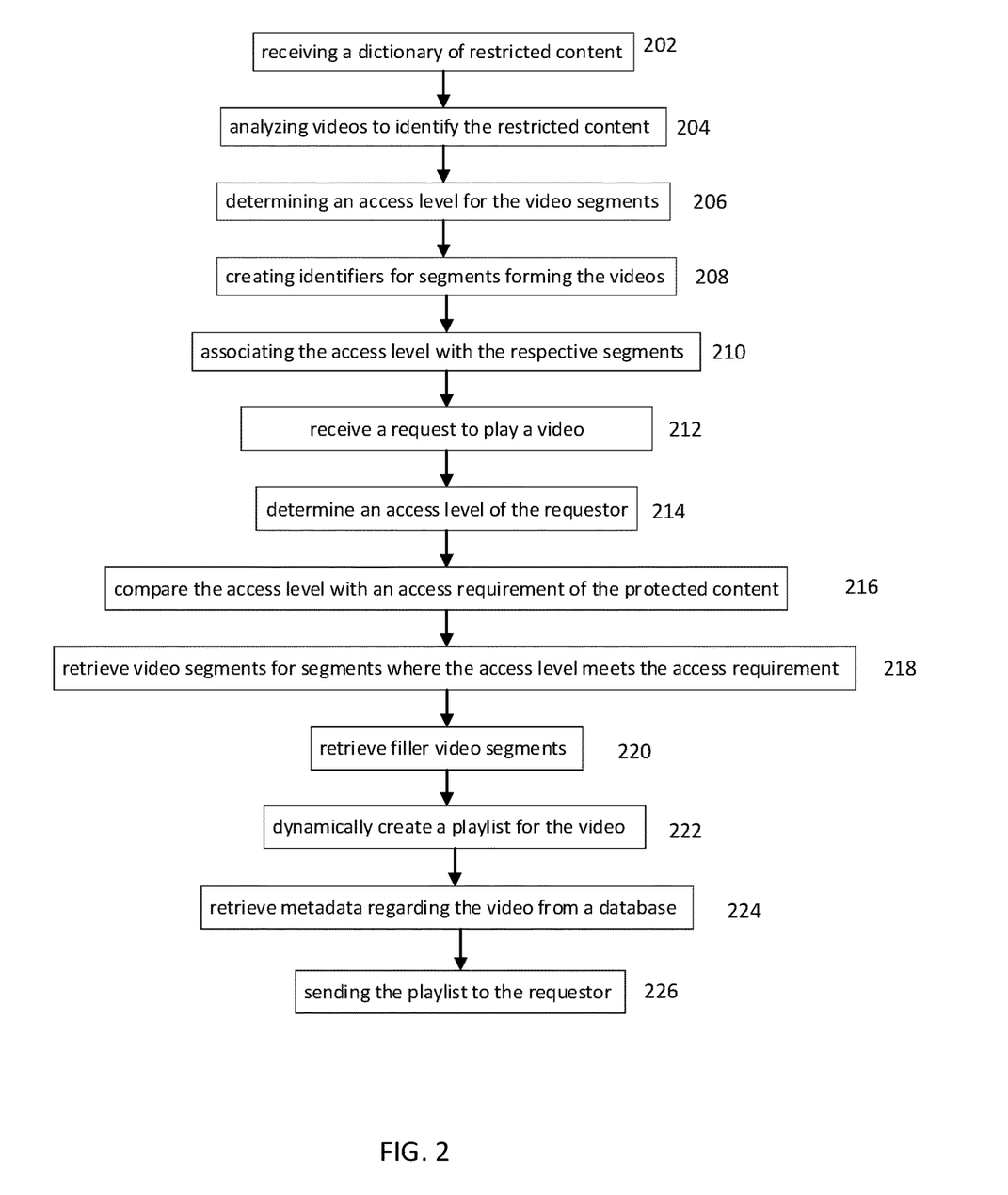
FIG. 2 illustrates an example method embodiment.

Referring next to FIG. 2, a flowchart showing an example method according to an embodiment of the invention is illustrated. FIG. 2 provides one example of the many functional arrangements that may implement the various applications described above. The various steps may be re-ordered or omitted for a particular implementation. Beginning with box 202, a dictionary of restricted content with associated access level may be received by the video tagging application 120. The dictionary data 160 of restricted content may be received by the video tagging application 120 from data store 112 or provided from a user. In box 204 the dictionary data 160 is used to identify restricted content in videos, for example, videos stored in data store 112. The image processing application 124 and transcription application 126 may provide output regarding the content of the video. These output may be compared to the dictionary data 160 to identify the restricted content. The videos may be analyzed prior to a request being received for the video, or dynamically as a request for a video is received. Once restricted content is identified in a video, where that content is in the context of the video is determined. For example, those video segments that include the restricted content are identified. The access level associated with the restricted content is retrieved from the dictionary data 120, boxes 206-208. The video segments including the restricted content are listed and associated with the access level of that content, box 210. This information may be stored as the access control list for the video in data store 112. The access control list may be metadata associated with the video data 164.

In box 212 playlist generating application 122 obtains a request for a video from a client 106. The access level of the requestor is determined in box 214. For example, the user account data 154 in the data store 122 may be utilized to determine the requestor's access level. The requested video is identified, for example, based on identification data 158. Whether the requested video includes any restricted content, and the access level of that content is determined in box 216. The access control list in data store 112 may be accessed by the playlist generating application 122 to identify those video segments with restricted content and the access requirement for that content. Those video segments where the access level of the user meets the access requirement are retrieved to form a first set of video segments, box 218. This may be the playlist generating application 122 retrieving an address or pointer to the video segments in the data store 112.

In box 220 filler/replacement video segments are retrieved for those video segments where the access level of the user does not meet the access requirement of the access control list to form a second set of video segments. Similarly, this may be accomplished by the playlist generating application 122 retrieving an address or pointer to the video segments in the data store 112. Once all of the necessary video segments are retrieved, a playlist for the video may be created, box 222. The playlist may be generated dynamically for the request and include the first and second set of video segments. Those video segments where the access level of the user does not meet the access requirement of the access control list are not part of the playlist. In box 226 the playlist is sent to the requestor.

Figure 3:
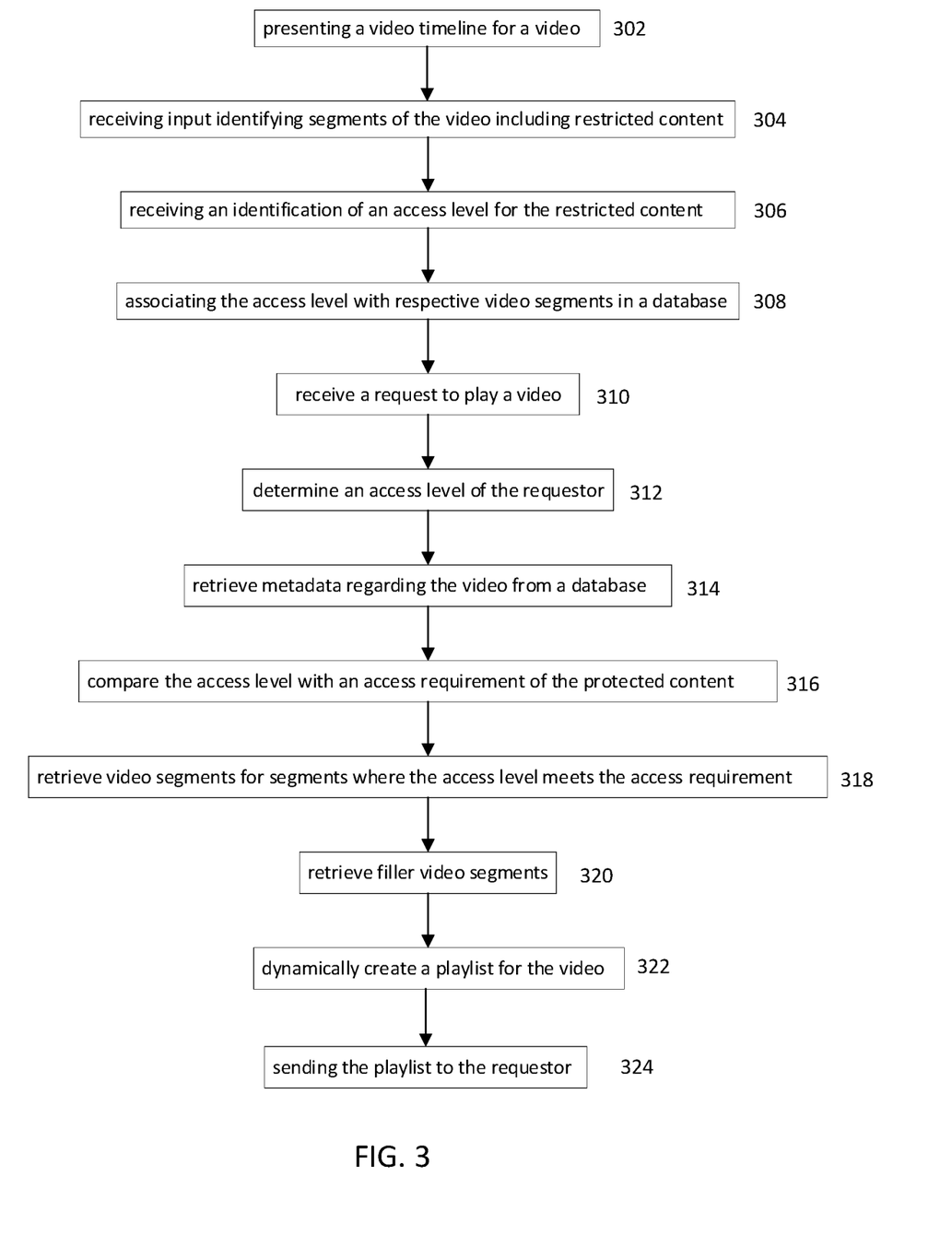
FIG. 3 illustrates an third example method embodiment.

Referring next to FIG. 3, a flowchart showing an example method according to an embodiment of the invention is illustrated. FIG. 3 provides one example of the many functional arrangements that may implement the various application described above. The various steps may be re-ordered or omitted for a particular implementation. Starting with box 302, a timeline for a video may be provided via video tagging application. The video tagging application may be part of a video editing application. The video to be edited or tagged may be retrieved by the video tagging application from the data store 112. Input identifying segments of the video including restricted content are received via the video tagging application, box 304. The input may be received from a user of the video tagging application. Per box 306, an identification of an access level for the restricted content is received. The access level is associated with respective video segments in a data store 112, box 308

In box 310, playlist generating application 122 obtains a request for a video from a client 106. The access level of the requestor is determined, box 312. For example, the user account data 154 in the data store 112 may be utilized to determine the requestor's access level. The requested video is identified. Whether the requested video includes any restricted content, and the access level of that content is determined, box 314. The access control list in data store 112 may be accessed by the playlist generating application 122 to identify those video segments with restricted content and the access requirement for that content. The access level of the user is compared with the access requirement of the content, box 316. Those video segments where the access level of the user meets the access requirement are retrieved, box 318. This may be accomplished by the playlist generating application 122 retrieving an address or pointer to the video segments in the data store 112.

In box 320 filler/replacement video segments are retrieved for those video segments where the access level of the user does not meet the access requirement of the access control list. Similarly, this may be the playlist generating application 122 retrieving an address or pointer to the video segments in the data store 112. Once all of the necessary video segments are retrieved, a playlist for the video may be created in box 322. The playlist may be generated dynamically for the request. Those video segments where the access level of the user does not meet the access requirement of the access control list are not part of the playlist. Per box 324 the playlist is sent to the requestor.

Figure 4:
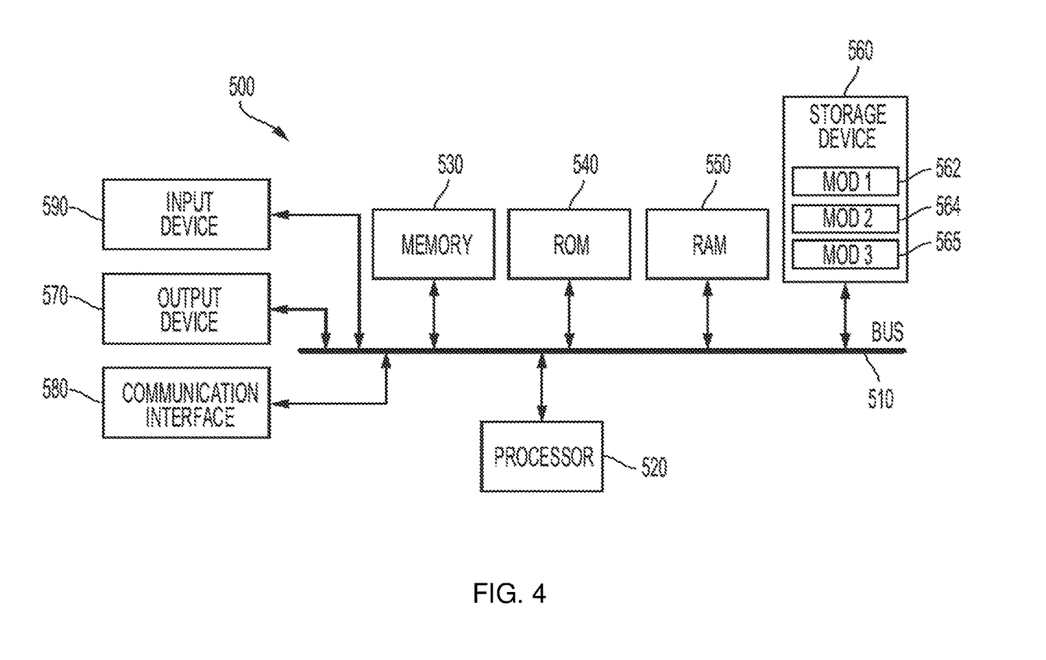
FIG. 4 illustrates an example computer system.

With reference to FIG. 4, an exemplary system includes a general-purpose computing device 500, including a processing unit (CPU or processor) 520 and a system bus 510 that couples various system components including the system memory 530 such as read-only memory (ROM) 540 and random-access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general-purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A system for secure video playback, the system comprising:
one or more processors; and
memory storing instructions that, when executed, cause the one or more processors to:
receive a request from a requestor to play a video;
determine an access level of the requestor;

retrieve metadata regarding the video from a database, the metadata including an access control list for the video and identifying video segments of the video that include protected content; compare the access level of the requestor with an access requirement of the protected content in the video;

retrieve video segments from the database for the video segments where the access level of the requestor meets the access requirement of the access control list to form a first set of video segments;

retrieve filler video segments for the video segments where the access level of the user does not meet the access requirement of the access control list to form a second set of video segments;

dynamically create a playlist for the video, the playlist including the first set of video segments and the second set of video segments, and not including the video segments where the access level of the user does not meet the access requirement of the access control list; and sending the playlist to the requestor.

2. The system of claim 1, wherein the instructions further cause the one or more processors to:

compare the videos to a dictionary of restricted content to identify the video segments of the video including restricted content;

tag the video segments of the video with the access level resulting in tagged segments; and store the video in a database.

3. The system of claim 2, wherein the instructions further cause the one or more processors to:

store the access control list and identifiers for the tagged segments in the database; and associate the metadata with the video.

4. The system of claim 1, wherein the instructions further cause the one or more processors to replace the video segments where the access level of the requestor does not meet the access requirement of the access control list with the filler segments.

5. The system of claim 3, wherein the identifier is one of time, segment, and frame number.

6. The system of claim 1, wherein the instructions further cause the one or more processors to authenticate the requestor.

7. The system of claim 6, wherein authenticating the requestor includes verifying the requestor's identity and access level.

8. The system of claim 1, wherein the access level is based on a security clearance.

9. The system of claim 1, wherein the instructions further cause the one or more processors to transcribe audio from the video into text.

10. The system of claim 2, wherein the instructions further cause the one or more processors to perform image recognition to identify the restricted content.

11. The system of claim 10, wherein the instructions further cause the one or more processors to perform facial recognition as the image recognition.

12. The system of claim 2, wherein the restricted content is at least one of an image and word.

13. A computer-implemented method, comprising:

receiving a dictionary of restricted content;

analyzing videos to identify the restricted content in the videos and a location of the restricted content in the videos;

determining an access level for the identified restricted content;

creating identifiers for video segments forming the videos;

associating the access level with the respective segments and storing as metadata with the video;

receiving a request from a requestor to play a video;

determining an access level of the requestor;

retrieving metadata regarding the video from a database, the metadata including an access control list for the video and for video segments of the video including protected content; comparing the access level of the requestor with the access level of the protected content;

retrieving video segments from the database for the video segments where the access level of the requestor meets an access requirement of the access control list to form a first set of video segments;

retrieving filler video segments for the video segments where the access level of the user does not meet the access requirement of the access control list to form a second set of video segments;

dynamically creating a playlist for the video, the playlist including the first set of video segments and the second set of video segments, and not including the video segments where the access level of the user does not meet the access requirement of the access control list; and sending the playlist to the requestor.

14. The computer implemented method of claim 13, wherein the access level is determined based on at least one of an individual, a group, and a security clearance.

15. The computer implemented method of claim 13, further comprising:

retrieving, from the database, the dictionary;

analyzing a transaction history to determine a benchmark parameter of the transaction history;

training a model using the dictionary and feedback data, resulting in a trained model; and performing predictive modeling using the trained model to determine identify restricted content.

16. The computer implemented method of claim 13, wherein the filler segments blur the protected content.

17. The computer implemented method of claim 13, wherein the filler segments are drawn from a source different from the video.

18. The computer implemented method of claim 13, wherein the filler segments are blank video.

19. A computer-implemented method, comprising:

presenting a video timeline for a video to a user via a video editing tool;

receiving input identifying segments of the video including restricted content;

receiving in an identification of an access level for the restricted content;

associating the access level with the video and with respective video segments including the restricted content, in a database;

receiving at a server a request from a requestor to play a video;

determining an access level of the requestor;

retrieving the access level for the video from the database;

compare the access level of the requestor with the access level of the restricted content;

retrieving video segments of the video where the access level of the user meets the access level for the video segment to form a first set of video segments;

retrieving filler video segments for the video segments where the access level of the user does not meet the access level for the video segment to form a second set of video segments;

dynamically create a playlist for the video, the playlist including the first set of video segments and the second sets of video segments, and not including the video segments where the access level of the user does not meet the access level; and sending the playlist to the requestor.

20. The computer implemented method of claim 13, wherein the video is one of live content and recorded content.

21. The computer implemented method of claim 13, wherein the metadata includes an access control list for the video and segments of the video including protected content.

* * * * *